US012603754B2

(12) United States Patent
Cheon et al.

(10) Patent No.: US 12,603,754 B2
(45) Date of Patent: Apr. 14, 2026

(54) ELECTRONIC APPARATUS FOR BOOTSTRAP PROCESSING HOMOMORPHIC ENCRYPTED MESSAGES AND METHODS THEREOF

(71) Applicant: CRYPTO LAB INC., Seoul (KR)

(72) Inventors: Jung Hee Cheon, Seoul (KR); Junyoung Jung, Seoul (KR); Taeseong Kim, Seoul (KR); Keewoo Lee, Seoul (KR); Jai Hyun Park, Seoul (KR)

(73) Assignee: CRYPTO LAB INC., Seoul (KR)

( * ) Notice: Subject to any disclaimer, the term of this patent is extended or adjusted under 35 U.S.C. 154(b) by 83 days.

(21) Appl. No.: 18/605,252

(22) Filed: Mar. 14, 2024

(65) Prior Publication Data

US 2024/0313946 A1     Sep. 19, 2024

(30) Foreign Application Priority Data

Mar. 16, 2023   (KR) ........................ 10-2023-0034684
Mar. 6, 2024    (KR) ........................ 10-2024-0032226

(51) Int. Cl.
*H04L 29/06*      (2006.01)
*H04L 9/00*       (2022.01)
*H04L 9/30*       (2006.01)

(52) U.S. Cl.
CPC ............ *H04L 9/008* (2013.01); *H04L 9/3033* (2013.01)

(58) Field of Classification Search
None
See application file for complete search history.

(56) References Cited

U.S. PATENT DOCUMENTS

| | | | | |
|---|---|---|---|---|
| 9,338,000 B2 * | 5/2016 | Naccache | ................. | H04L 9/30 |
| 9,524,392 B2 * | 12/2016 | Naehrig | ............... | G06F 21/602 |
| 9,876,636 B2 * | 1/2018 | Yagisawa | .............. | H04L 9/0822 |
| 10,057,057 B2 * | 8/2018 | Gentry | ..................... | H04L 9/30 |
| 10,541,805 B2 * | 1/2020 | Laine | ..................... | H04L 9/008 |
| 10,778,409 B2 * | 9/2020 | Cheon | .................. | H04L 9/3093 |
| 2023/0012099 A1 * | 1/2023 | Papadimitriou | ........ | H04L 9/008 |
| 2023/0146149 A1 * | 5/2023 | Moon | .................. | H04L 9/3073 |
| | | | | 380/28 |

OTHER PUBLICATIONS

Cheon, A Full RNS Variant of Approximate Homomorphic Encryption, Cryptology ePrint Archive, 21 pages. (Year: 2018).*

* cited by examiner

*Primary Examiner* — Maung T Lwin
(74) *Attorney, Agent, or Firm* — Steinfl + Bruno LLP

(57) ABSTRACT

Disclosed are an electronic apparatus and a control method thereof. According to the present disclosure, an electronic apparatus with N-bit hardware architecture includes a memory configured to store a scaling factor, and a processor configured to obtain a homomorphic encrypted message with an M*N-bit word size, and perform an operation on the homomorphic encrypted message using the scaling factor. In this case, the M is an integer of 2 or more, and the scaling factor is composed of M prime numbers.

10 Claims, 8 Drawing Sheets

<u>400</u>

$ct^1 = (c_0^1, c_1^1)$, $ct^2 = (c_0^2, c_1^2)$

☐ : linear to t

▨ : quadratic to t,
where t: number of primes in each scaling factor

ELECTRONIC APPARATUS FOR BOOTSTRAP PROCESSING HOMOMORPHIC ENCRYPTED MESSAGES AND METHODS THEREOF

TECHNICAL FIELD

The present disclosure relates to an electronic apparatus for bootstrap processing homomorphic encrypted messages and a method thereof, and more particularly, to an apparatus for efficiently bootstrap processing homomorphic encrypted messages with a word size larger than the number of bits of hardware architecture of an electronic apparatus, and a method thereof.

BACKGROUND ART

As communication technology develops and electronic apparatuses spread, efforts are continuously made to maintain communication security between the electronic apparatuses. Accordingly, encryption/decryption technology is used in most communication environments.

When messages encrypted by the encryption technology are delivered to the other party, the other party needs to perform decryption in order to use the messages. In this case, the other party wastes resources and time in the process of decrypting the encrypted data. In addition, when the third party hacks messages while the other party temporarily decrypts the messages for an operation, there is a problem in that the messages may be easily leaked to the third party.

In order to solve this problem, a homomorphic encryption method is being studied. According to the homomorphic encryption, even if the operation is performed on encrypted messages themselves without decrypting the encrypted information, it is possible to obtain the same result as the encrypted value after the operation is performed on a plain text. Accordingly, various types of operations may be performed without decrypting the encrypted messages.

Meanwhile, when an electronic apparatus with N-bit (e.g., 32-bit) hardware architecture receives a homomorphic encrypted message with a word size (e.g., a 64-bit word size) larger than N bits, the electronic apparatus performs the operation on the homomorphic encrypted message using multi-precision arithmetic. In this case, the multi-precision arithmetic is an arithmetic technique that uses multiple basic data types (e.g., integer, floating point) for one variable to express numbers with precision greater than or equal to the fixed number of bits. In other words, when the number of bits in the hardware architecture is fixed, the number of bits that may be processed at once is limited because it has words with a fixed size or a size of a register, but when using the multi-precision arithmetic, multiple words may be used for one variable to store numbers.

However, since the method using the multi-precision arithmetic suffers from significant delay problems, there may be limitations in performing the operation on the homomorphic encrypted message based on a residue number system (RNS).

DISCLOSURE

Technical Problem

An object of the present disclosure is to provide an electronic apparatus for bootstrap processing homomorphic encrypted messages using a scaling factor composed of a plurality of prime numbers, and a control method thereof.

Technical Solution

According to an aspect of the present disclosure, an electronic apparatus with N-bit hardware architecture includes a memory configured to store a scaling factor, and a processor configured to obtain a homomorphic encrypted message with M*N-bit word sizes, and perform an operation on the homomorphic encrypted message using the scaling factor, in which the M may be an integer of 2 or more, and the scaling factor may be composed of M prime numbers.

M prime numbers constituting the scaling factor may satisfy 1 modulo 2n, where the n may be a ring dimension.

The M prime numbers constituting the scaling factor may be numbers smaller than $2^K$, and the K may be smaller than N by a preset number.

The scaling factor may be expressed as a product of the M prime numbers, and a ratio of the M prime numbers may be within a preset range.

The N may be 32, and the M may be 2.

According to another aspect of the present disclosure, a control method of an electronic apparatus storing a scaling factor and having N-bit hardware architecture includes: obtaining a homomorphic encrypted message with an M*N-bit word size; and performing an operation on the homomorphic encrypted message using the scaling factor, in which the M is an integer of 2 or more, and the scaling factor is composed of M prime numbers.

M prime numbers constituting the scaling factor may satisfy 1 modulo 2n, where n is a ring dimension.

The M prime numbers constituting the scaling factor may be numbers smaller than $2^K$, and the K may be smaller than N by a preset number.

The scaling factor may be expressed as a product of the M prime numbers, and a ratio of the M prime numbers may be within a preset range.

The N may be 32, and the M may be 2.

Advantageous Effects

By various embodiments of the present disclosure as described above, it is possible to improve an operation speed for a homomorphic encrypted message with a word size larger than the number of bits of hardware architecture.

DESCRIPTION OF DRAWINGS

FIGS. 5 to 7 are diagrams for describing a scaling factor composed of a plurality of prime numbers according to an embodiment of the present disclosure.

MODE FOR INVENTION

Figure 1:
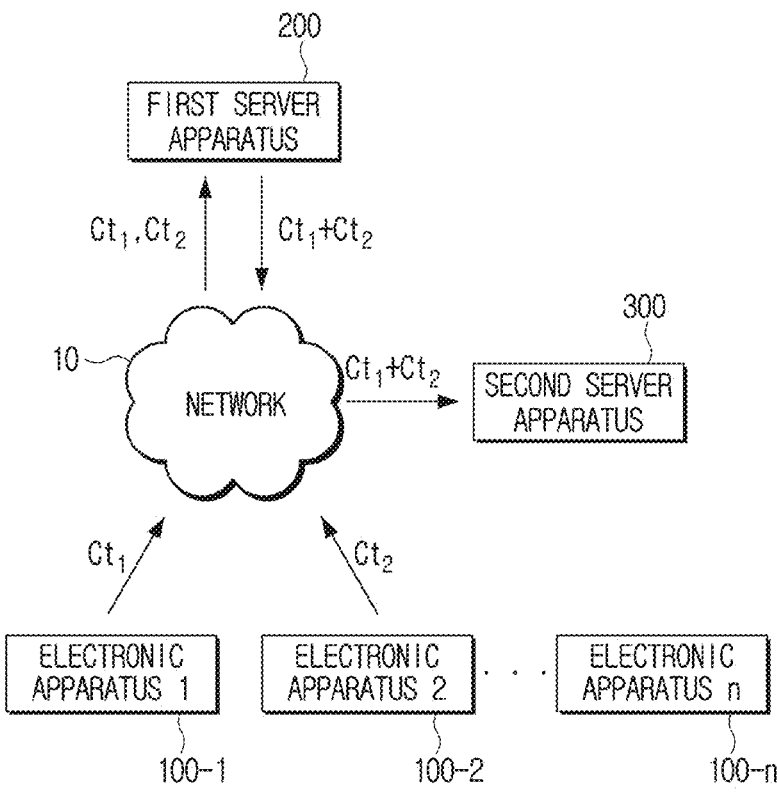
FIG. 1 is a diagram for describing a structure of a network system according to an embodiment of the present disclosure.

Hereinafter, the present disclosure will be described in detail with reference to the accompanying drawings. Encryption/decryption may be applied to an information (data) transmission process performed in the present disclosure if necessary, and all expressions describing the information (data) transmission process in the present disclosure and claims should be interpreted as including cases of encryption/decryption even if not separately stated. In the present disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the present disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, "A or B" is defined to mean not only selectively indicating either one of A and B, but also including both A and B. In addition, in the present disclosure, the term "include" has a meaning encompassing further including other components in addition to elements listed as included.

In this disclosure, only essential components necessary for the description of the present disclosure are described, and components unrelated to the essence of the present disclosure are not mentioned. In addition, it should not be interpreted as an exclusive meaning that includes only the mentioned components, but should be interpreted as a non-exclusive meaning that may include other components.

In addition, in the present disclosure, "value" is defined as a concept including a vector as well as a scalar value. In the present disclosure, the expressions such as "calculate," and "compute" may be replaced by an expression that produces a result of the corresponding computation or calculation. In addition, unless otherwise stated, an operation on an encrypted message to be described below means a homomorphic operation. For example, an addition of a homomorphic encrypted message means a homomorphic addition of two homomorphic encrypted messages.

Mathematical operations and calculations of each step of the present disclosure to be described below may be implemented as computer operations by the known coding method and/or coding designed to suit the present disclosure for the corresponding operation and calculation.

Specific equations to be described below are illustratively described among possible alternatives, and the scope of the present disclosure should not be construed as being limited to equations mentioned in the present disclosure.

For convenience of description, in the present disclosure, a notation is defined as follows.

a←D: select element (a) according to distribution (D)

s1, s2∈R: S1, S2: Each of S1 and S2 is an element belonging to set R.

mod(q): Modular operation with element q

⌊•⌉: Round-off internal value

Hereinafter, diverse embodiments of the present disclosure will be described in detail with reference to the accompanying drawings.

FIG. 1 is a diagram for describing a structure of a network system according to an embodiment of the present disclosure.

Referring to FIG. 1, a network system may include a plurality of electronic apparatuses 100-1 to 100-n, a first server apparatus 200, and a second server apparatus 300, each of which may be connected to each other through a network 10.

The network 10 may be implemented in various types of wired and wireless communication networks, broadcasting communication networks, optical communication networks, cloud networks, etc., and each apparatus may also be connected through methods such as Wi-Fi, Bluetooth, Near Field Communication (NFC), etc., without a separate medium.

Although FIG. 1 illustrates a plurality of electronic apparatuses 100-1 to 100-n, a plurality of electronic apparatuses are not necessarily used, and one apparatus may be used. For example, the electronic apparatuses 100-1 to 100-n may be implemented as various types of apparatuses such as smart phones, tablets, game players, PCs, laptop PCs, home servers, and kiosks. In addition, the electronic apparatuses 100-1 to 100-n may be implemented in the form of home appliances to which an IoT function is applied.

Users may input various types of information through the electronic apparatuses 100-1 to 100-n they use. The input information may be stored in the electronic apparatuses 100-1 to 100-n themselves, but may also be transmitted to and stored in an external device for storage capacity and security reasons. In FIG. 1, the first server apparatus 200 may serve to store such information, and the second server apparatus 300 may serve to use some or all of the information stored in the first server apparatus 200.

Each of the electronic apparatuses 100-1 to 100-n may perform homomorphic encryption on the input information and transmit the homomorphic encrypted message to the first server apparatus 200.

Each of the electronic apparatuses 100-1 to 100-n may include encryption noise, i.e., an error, calculated in the process of performing homomorphic encryption in an encrypted message. Specifically, the homomorphic encrypted messages generated by each of the electronic apparatuses 100-1 to 100-n may be generated in a form in which a result value including a message and an error value is restored when decrypted later using a secret key.

For example, when the homomorphic encrypted messages generated by the electronic apparatuses 100-1 to 100-n are decrypted using a secret key, the homomorphic encrypted messages may be generated in a form that satisfies the following natures.

$$Dec(ct, sk) = \langle ct, sk \rangle = M + e(\bmod q) \qquad \text{[Equation 1]}$$

Here, $\langle$, $\rangle$ denotes a usual inner product, ct denotes an encrypted message, sk denotes a secret key, M denotes a plain text message, e denotes an encryption error value, and mod q denotes a modulus of an encrypted message. q should be selected to be greater than a result value M obtained by multiplying a scaling factor $\Delta$ by a message. When an absolute value of the error value e is sufficiently small compared to M, a decryption value M+e of the encrypted message is a value that may replace the original message with the same precision in significant figure operation. Among the decrypted data, an error may be arranged on the least significant bit (LSB) side, and M may be arranged on the next least significant bit side.

When a size of the message is too small or too large, the size may be adjusted using a scaling factor. When the scaling factor is used, not only an integer type message but also a real number type message may be encrypted, and thus, the usability of the message may be greatly increased. In addition, by adjusting the size of the message using the scaling factor, a size of an area where messages exist in the encrypted message after the operation is made, that is, a size of an effective area may also be adjusted.

According to the embodiment, a modulus q of the encrypted message may be set and used in various forms. For example, the modulus of the encrypted message may be set in the form of an exponential power $q=\Delta^L$ of the scaling factor $\Delta$. When $\Delta$ is 2, $\Delta$ may be set to a value such as $q=2^{10}$.

In addition, the homomorphic encrypted message according to the present disclosure is described on the assumption that a fixed point is used, but may be applied even when a floating point is used.

The first server apparatus 200 may store the received homomorphic encrypted message in an encrypted message state without decrypting received homomorphic encrypted message.

The second server apparatus 300 may request a specific processing result for the homomorphic encrypted message from the first server apparatus 200. The first server apparatus 200 may perform specific operation according to the request of the second server apparatus 300 and then transmit the result to the second server apparatus 300.

For example, when encrypted messages $ct_1$ and $ct_2$ transmitted by the two electronic apparatuses 100-1 and 100-2 are stored in the first server apparatus 200, the second server apparatus 300 may request, from the first server apparatus 200, a value obtained by summing information provided from the two electronic apparatuses 100-1 and 100-2. The first server apparatus 200 may perform an operation for summing the two encrypted messages according to the request, and then transmit the result value $ct_1+ct_2$ to the second server apparatus 300.

Due to the nature of the homomorphic encrypted message, the first server apparatus 200 may perform the operation without the decryption, and the result value is also in the form of an encrypted message. In the present disclosure, the result value obtained by the operation is referred to as an operated encrypted message.

The first server apparatus 200 may transmit the operated encrypted message to the second server apparatus 300. The second server apparatus 300 may decrypt the received operated encrypted message and acquire operated values of data included in each homomorphic encrypted message.

Meanwhile, the electronic apparatus 100 may have N-bit (e.g., 32-bit) hardware architecture. In this case, the electronic apparatus 100 may store a scaling factor for performing an operation a homomorphic encrypted message with an M*N (where M is an integer of 2 or more)-bit word size. In particular, the scaling factor stored in the electronic apparatus 100 may be composed of M prime numbers. For example, when the homomorphic encrypted message with a 64-bit word size is received by the electronic apparatus 100 with 32-bit hardware architecture, the electronic apparatus 100 may store a scaling factor composed of two prime numbers to perform an operation on the homomorphic encrypted message with a 64-bit word size. In this case, the two prime numbers are numbers smaller than $2^{\wedge}32$, and the electronic apparatus 100 performs various operations on the homomorphic encrypted message using the two prime numbers, thereby performing the operation on the homomorphic encrypted message with the 64-bit word size without performing multi-precision arithmetic.

As a result, the electronic apparatus 100 may perform the operation on the homomorphic encrypted message at a faster rate than a method using the multi-precision arithmetic.

Meanwhile, FIG. 1 illustrates a case where the first electronic apparatus and the second electronic apparatus perform the encryption and the second server apparatus performs the decryption, but is not necessarily limited thereto.

Figure 2:
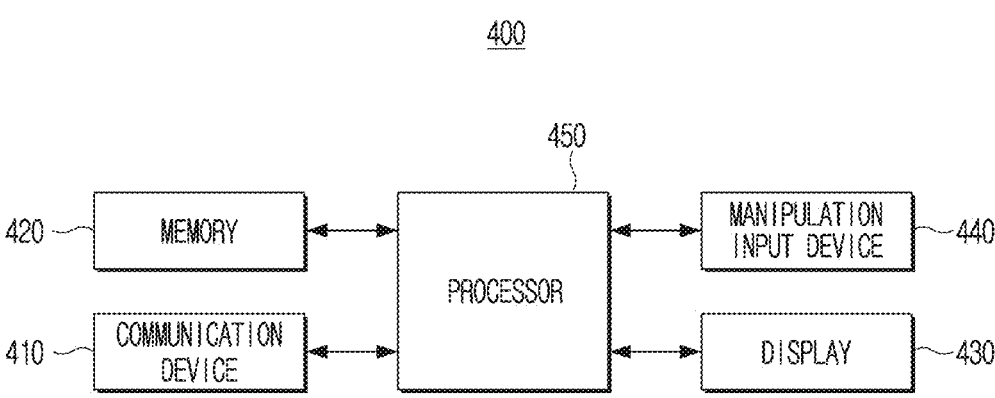
FIG. 2 is a block diagram illustrating a configuration of an operation apparatus according to an embodiment of the present disclosure.

FIG. 2 is a block diagram illustrating a configuration of an operation apparatus according to an embodiment of the present disclosure.

Specifically, in the system of FIG. 1, an apparatus that performs homomorphic encryption, such as a first electronic apparatus and a second electronic apparatus, an apparatus that operates the homomorphic encrypted message, such as a first server apparatus, and an apparatus that decrypts the homomorphic encrypted message, such as a second server apparatus, may be referred to as an electronic apparatus. The electronic apparatus may be various apparatuses such as a personal computer (PC), a laptop computer, a smart phone, a tablet, and a server.

Referring to FIG. 2, the electronic apparatus 400 may include a communication device 410, a memory 420, a display 430, a manipulation input device 440, and a processor 450.

Meanwhile, the electronic apparatus 400 may have N-bit hardware architecture. In this case, the number of bits of the hardware architecture may mainly indicate the number of bits of data that the processor 450 may process at once. The number of bits of the hardware architecture is related to a size of a register, a size of an address bus, a size of a data bus, etc. As an example, the electronic apparatus 400 may have 32-bit or 64-bit hardware architecture. That is, the electronic apparatus 100 with 32-bit hardware architecture may process 32-bit data at once, and the electronic apparatus 100 with 64-bit hardware architecture may process 64-bit data at once. Simply describing, the electronic apparatus 100 with the 64-bit hardware architecture may process twice as much data at once as the electronic apparatus 100 with 32-bit hardware architecture.

Meanwhile, according to an embodiment of the present disclosure, the electronic apparatus 100 may have the 32-bit hardware architecture.

The communication device 410 is formed to connect the electronic apparatus 400 to an external device (not illustrated), and may be connected to the external device through a local area network (LAN) and the Internet network or be connected to the external device through a USB port or a wireless communication (for example, wireless fidelity (WiFi), 802.11a/b/g/n, near field communication (NFC), or Bluetooth) port. Such a communication device 410 may also be referred to as a transceiver.

The communication device 410 may receive the public key from the external device and may transmit the public key generated by the electronic apparatus 400 itself to an external device.

Also, the communication device 410 may receive a message from the external device and transmit the generated homomorphic encrypted message to the external device.

Also, the communication device 410 may receive various parameters required for generating an encrypted message from an external device. Meanwhile, upon implementation, various parameters may be directly received from a user through the manipulation input device 440 to be described later.

In addition, the communication device 410 may receive a request for the operation of the homomorphic encrypted message from an external device and transmit the calculated result to the external device. In this case, the communication device 410 may receive a homomorphic encrypted message with a M*N-bit word size from the external device. For example, the communication device 410 may receive the homomorphic encrypted message with a 64-bit word size from the external device.

The memory 420 is a component for storing O/S for driving the electronic apparatus 400, various software, data, and the like. The memory 420 may be implemented in various forms such as RAM, ROM, flash memory, HDD, external memory, and memory card, but is not limited to any one.

The memory 420 stores the message to be encrypted. Here, the message may be various types of credit information, personal information, and the like cited by a user, and may also be information related to location information used in the electronic apparatus 400 and a use history such as Internet usage time information.

In addition, the memory 420 may store a public key, and when the electronic apparatus 400 is an apparatus that directly generates the public key, the memory 420 may store not only a secret key, but also various parameters necessary for generating the public key and the secret key Also, the memory 420 may store the homomorphic encrypted message generated in the process described below. Also, the memory 420 may store the homomorphic encrypted message transmitted from the external device. Also, the memory 420 may store the operated encrypted message that is the result of the operation process described later.

In addition, the memory 420 may store a scaling factor for performing the operation on the homomorphic encrypted message. In this case, the scaling factor may be one of values used to convert the homomorphic encrypted message into a plain text. In addition, the homomorphic encryption is able to perform the calculation on the homomorphic encrypted message, and the scaling factor may be one of important parameters used to perform a mathematical operation on the homomorphic encrypted message. In this case, the scaling factor may be called various terms such as parameters.

Meanwhile, according to an embodiment of the present disclosure, the scaling factor may be composed of a plurality (M) of prime numbers. For example, when the electronic apparatus 100 has a 32-bit hardware architecture and the word size of the homomorphic encrypted message received from the outside is 64 bits, the memory 420 may store groups of scaling factors composed of two prime numbers. As another example, when the electronic apparatus 100 has a 32-bit hardware architecture and the word size of the homomorphic encrypted message received from the outside is 96 bits, the memory 420 may store groups of scaling factors composed of three prime numbers. As another example, when the electronic apparatus 100 has a 32-bit hardware architecture and the word size of the homomorphic encrypted message received from the outside is 128 bits, the memory 420 may store groups of scaling factors composed of four prime numbers.

Meanwhile, M prime numbers constituting the scaling factor may satisfy 1 modulo 2n. In this case, n may be a ring dimension.

In addition, the M prime numbers constituting the scaling factor may be numbers smaller than $2^K$, and K may be smaller than N by a preset number. For example, each of the M prime numbers that constitutes the scaling factor may be a number less than $2^{30}$.

In addition, the scaling factor may be expressed as a product of the M prime numbers, and a ratio of the M prime numbers may be within a preset range.

The display 430 displays a user interface window for selecting a function supported by the electronic apparatus 400. Specifically, the display 430 may display a user interface window for selecting various functions provided by the electronic apparatus 400'. The display 430 may be a monitor such as a liquid crystal display (LCD) and organic light emitting diodes (OLED), and may be implemented as a touch screen capable of simultaneously performing the functions of the manipulation input device 440 to be described later.

The display 430 may display a message requesting input of parameters necessary for generating a secret key and a public key. Also, the display 430 may display a message in which an encryption target selects a message. Meanwhile, in implementation, the encryption target may be directly selected by a user or may be automatically selected. That is, personal information or the like that requires encryption may be automatically set even if a user does not directly select a message.

The manipulation input device 440 may select a function of the electronic apparatus 400 and receive a control command for the function from the user. Specifically, the manipulation input device 440 may receive parameters necessary for generating a secret key and a public key from the user. Also, the manipulation input device 440 may receive the message to be encrypted from the user.

The processor 450 may control each component of the electronic apparatus 400. The processor 450 may be composed of a single device such as a central processing unit (CPU) and an application-specific integrated circuit (ASIC), or may be composed of a plurality of devices such as a CPU and a graphics processing unit (GPU).

In this case, the processor 450 may have architecture that may process 32-bit data at once.

When the message to be transmitted is input, the processor 450 stores the message in the memory 420. The processor 450 uses various setting values and programs stored in the memory 420 to perform homomorphic encryption on the message. In this case, the public key may be used.

The processor 450 may generate and use a public key required to perform encryption by itself, or may receive and use the public key from an external device. For example, the second server apparatus 300 that performs the decryption may distribute a public key to other devices.

When generating a key by itself, the processor 450 may generate a public key using a Ring-LWE technique. Specifically, the processor 450 may first set various parameters and rings and store the parameters and rings in the memory 420. Examples of the parameters may include lengths of plain text message bits, sizes of public and secret keys, and the like.

The ring may be represented by the following equation.

$$R = Z_q[X]/f(x) \qquad \text{[Equation 2]}$$

Here, R denotes a ring, Zq denotes a coefficient, and f(x) denotes an n-th polynomial.

The ring is a set of polynomials having predetermined coefficients, and means a set in which addition and multiplication are defined between elements and which is closed for addition and multiplication. Such a ring may be referred to as an annulus.

For example, the ring means a set of n-th polynomials having a coefficient Zq. Specifically, when n is $\Phi(N)$, it refers to polynomials that may be calculated as the remainder of dividing the polynomial by an N-th cyclotomic polynomial. f(x) denotes ideal of Zq[x] generated by the f(x). The Euler totient function $\Phi(N)$ means the number of natural numbers that is coprime to N and smaller than N. When $\Phi_N(x)$ is defined as an N-th cyclotomic polynomial, the ring may also be represented by Equation 3 as follows.

$$R = Z_q[X]/\Phi_N(x) \qquad \text{[Equation 3]}$$

A secret key sk may be represented as follows.

Meanwhile, the ring of Equation 3 described above has a complex number in the plain text space. Meanwhile, in order to improve the operation speed of the homomorphic encrypted message, only a set in which the plain text space is a real number in the above-described set of rings may be used.

When such a ring is set, the processor 450 may calculate the secret key sk from the ring.

$$sk \leftarrow (1, s(x)), s(x) \in R \qquad \text{[Equation 4]}$$

Here, s(x) means a polynomial generated randomly with small coefficients.

The processor 450 calculates a first random polynomial a(x) from the ring. The first random polynomial may be expressed as follows.

$$a(x) \leftarrow R \qquad \text{[Equation 5]}$$

In addition, the processor 450 may calculate an error. Specifically, the processor 450 may extract an error from a discrete Gaussian distribution or a distribution statistically close to the discrete Gaussian distribution. This error may be expressed as follows.

$$e(x) \leftarrow D_{\alpha q}^n \qquad \text{[Equation 6]}$$

When the error is calculated, the processor 450 may calculate a second random polynomial by performing a modular operation on the error in the first random polynomial and the secret key. The second random polynomial may be expressed as follows.

$$b(x) = -a(x)s(x) + e(x)(\bmod q) \qquad \text{[Equation 7]}$$

Finally, a public key pk is set as follows in a form including the first random polynomial and the second random polynomial.

$$pk = (b(x), a(x)) \qquad \text{[Equation 8]}$$

Since the above-described key generation method is only an example, it is not necessarily limited thereto, and it goes without saying that the public key and the secret key may be generated by other methods.

Meanwhile, when a public key is generated, the processor 450 may control the communication device 410 to transmit the public key to other devices.

The processor 450 may generate a homomorphic encrypted message for a message. Specifically, the processor 450 may generate a homomorphic encrypted message by applying the previously generated public key to the message. In this case, the processor 450 may generate the length of the encrypted message to correspond to the size of the scaling factor $\Delta$.

When the homomorphic encrypted message is generated, the processor 450 may control the communication device 410 to store the homomorphic encrypted message in the memory 420 or transmit the homomorphic encrypted message to another device according to a user request or a preset default command.

Meanwhile, according to an embodiment of the present disclosure, packing may be performed. When the packing is used in the homomorphic encryption, it becomes possible to encrypt a plurality of messages into one encrypted message. In this case, when the electronic apparatus 400 performs an operation between each encrypted message, since operations for a plurality of messages are processed in parallel, the operation burden is greatly reduced.

Specifically, when a message is composed of a plurality of message vectors, the processor 450 may transform a plurality of message vectors into a polynomial in a form that the plurality of message vectors may be encrypted in parallel, multiply the polynomial by a scaling factor, and perform the homomorphic encryption using a public key. Accordingly, an encrypted message in which a plurality of message vectors are packed may be generated.

Further, when the homomorphic encrypted message needs to be decrypted, the processor 450 may apply a secret key to the homomorphic encrypted message to generate a polynomial-type decrypted message, and decode the polynomial-type decrypted message to generate a message. In this case, the generated message may include an error as mentioned in Equation 1 described above.

The processor 450 may perform the operation on the encrypted message. Specifically, the processor 450 may perform operations such as addition or multiplication on a homomorphic encrypted message while maintaining an encrypted state. Specifically, the processor 450 may perform first function processing on each of the homomorphic encrypted messages to be used in the operation, perform the operation such as addition or multiplication between the homomorphic encrypted messages subjected to the first function processing, and perform second function processing, which is an inverse function to the first function, on the operated homomorphic encrypted message. For the first function processing and the second function processing, a linear transformation technique in a rebooting process described later may be used.

Meanwhile, when the operation is completed, the electronic apparatus 400 may detect data in an effective area from the operated data. Specifically, the electronic apparatus 400 may detect the data in the effective area by performing rounding processing on the operated data. The rounding processing means rounding-off a message in an encrypted state, and may also be referred to as rescaling. Specifically, the electronic apparatus 400 removes a noise region by multiplying each component of the encrypted message by $\Delta^{-1}$ which is the reciprocal of the scaling factor, and rounding-off each component of the encrypted message. The noise area may be determined to correspond to the size of the scaling factor. As a result, it is possible to detect a message in the effective area from which the noise area is excluded. Since it proceeds in the encrypted state, an additional error occurs, but the size is small enough to be ignored.

In addition, the electronic apparatus 400 may perform the rebooting operation on the encrypted message when the proportion of the approximate message in the operated encrypted message exceeds a threshold. Specifically, the electronic apparatus 400 may expand the modulus of the operated encrypted message, perform a first linear transformation of the homomorphic encrypted message with the expanded modulus into a polynomial form, approximate the first homomorphic encrypted message converted into the polynomial form using a function set to approximate the modulated range of the plain text, perform a second linear transformation of the approximated second homomorphic encrypted message into the homomorphic encrypted message, and perform a subtraction operation of the second homomorphic encrypted message obtained by the second linear transformation from the homomorphic encrypted message whose modulus has been expanded to generate the homomorphic encrypted message with an expanded plain text space.

As described above, the electronic apparatus 400 may use the scaling factor $\Delta$ in the process of encrypting a plain text message into the homomorphic encrypted message or in the process of performing the operation on the homomorphic encrypted message.

A method of performing an operation on a homomorphic encrypted message using a scaling factor will be described with reference to FIGS. 3 to 7.

Figure 3:
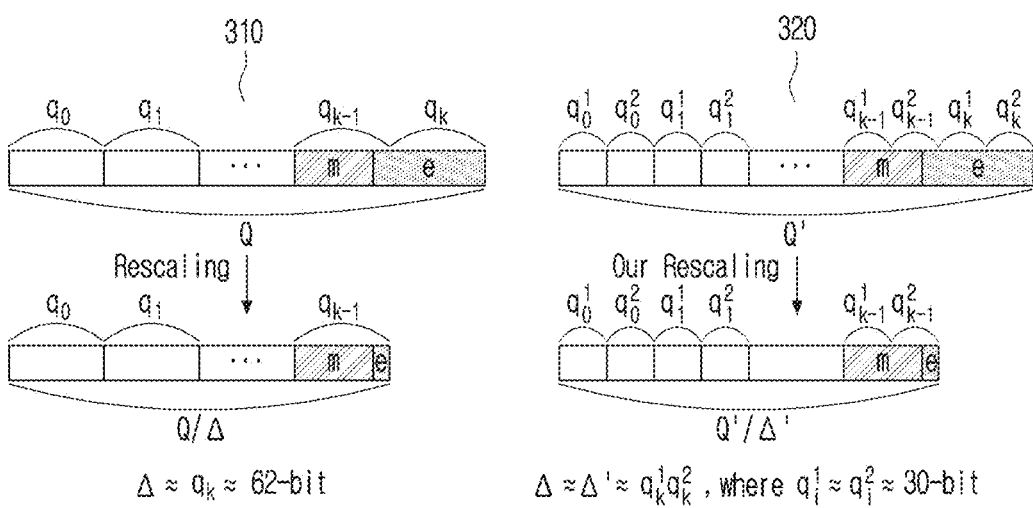
FIG. 3 is a diagram for describing a method of performing a rescaling operation according to an embodiment of the present disclosure.

FIG. 3 is a diagram for describing a method of performing a rescaling operation according to an embodiment of the present disclosure.

As illustrated in the left drawing 310 of FIG. 3, when the electronic apparatus 100 with 64-bit hardware architecture performs the rescaling operation on the homomorphic encrypted message with the 64-bit word size, the electronic apparatus 100 may perform the rescaling operation using a 62-bit scaling factor which has a preset number of bits smaller than 64 bits. In addition, qk may also have 62 bits.

As illustrated in the right drawing 320 of FIG. 3, when the electronic apparatus 100 with 32-bit hardware architecture performs the rescaling operation on the homomorphic encrypted message with a 64-bit word size, the electronic apparatus 100 may perform the rescaling operation using a 30-bit scaling factor which has a preset number of bits smaller than 32 bits. In this case, q1k and q2k may have 30 bits.

In particular, the electronic apparatus 100 may estimate costs of the rescaling operation using a conventional method (e.g., the left side 310 of FIG. 3) and the method (e.g., the right side 320 of FIG. 3) of the present disclosure in consideration of the number of times of modular multiplications.

Figure 4:
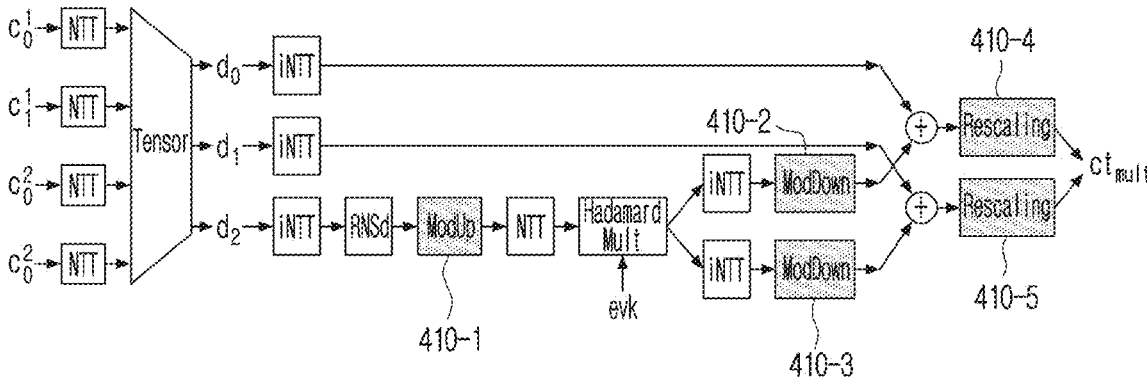
FIG. 4 is a diagram illustrating a modular for performing a relinearize operation according to an embodiment of the present disclosure.

In an embodiment of the present disclosure, as illustrated in FIG. 4, the electronic apparatus 100 may perform a relinearize operation using a plurality of modulars. In particular, FIG. 4 may be a diagram for illustrating the number of operations that increases in proportion to the number of prime numbers when the number (=t) of prime numbers changes during the relinearize operation. Specifically, when the number of prime numbers constituting the rescaling factor is plural (M), as in the embodiment of the present disclosure, the total number of times of modular multiplications may increase linearly with the number of prime numbers. However, the cost of multiplication of modular units 410-1 to 410-5 shown in FIG. 4 may increase as a square of the size of the prime number compared to the number of bits of the hardware architecture of the electronic apparatus 100. Therefore, as in the present disclosure, a method using a plurality of prime numbers may have the effect of increasing the operation speed compared to the related art.

As described above, when the electronic apparatus 100, which has a 32-bit hardware architecture, performs the operation on the homomorphic encrypted message with the 64-bit word size, the electronic apparatus 100 performed the operation on the homomorphic encrypted message using the multi-precision arithmetic based on 32 bits. However, in this case, the electronic apparatus 100 may clearly oppose the advantages of the residue number system (RNS)-based implementation due to the significant reduction in speed.

When performing the operation on the 64-bit homomorphic encrypted message in the electronic apparatus 100 with 32-bit hardware architecture, the most affected part is the RNS implementation. In other words, in order not to use the multi-precision arithmetic like the conventional approach, the RNS modulus should be adjusted to a 32-bit word size.

According to an embodiment of the present disclosure, the electronic apparatus 100 may group a plurality of RNS prime numbers and store the product of the corresponding RNS prime numbers as the scaling factor. That is, conventionally, the scaling factor was stored as a single prime number, but according to the present disclosure, the scaling factor may be stored in the form of a product of a prime number.

As in the present disclosure, when using the scaling factor implemented as the product of a plurality of prime numbers, the most affected part is Fast Basis Conversion, which is the core of CKKS-RNS transformation. However, the error generated by Fast Basis Conversion may be determined by the number of RNS prime numbers constituting the encrypted message modulus Q. Since double RNS prime numbers should be used in the 32-bit hardware architecture compared to the 64-bit hardware architecture, the errors that occur in the Fast Basis Conversion may increase by up to 1 bit. This may have a minor effect on other dominant error misperceptions.

According to an embodiment of the present disclosure, the electronic apparatus 100 may consider the following criteria to select the RNS prime number in the 32-bit hardware architecture.

1) The electronic apparatus 100 may select a prime number that satisfies 1 modulo 2n. In this case, n may be a ring dimension. Accordingly, the electronic apparatus 100 may perform efficient polynomial multiplication using number theoretic transform (NTT).

2) The electronic apparatus 100 may select a prime number to efficiently perform the modular multiplication in the 32-bit hardware architecture. To use Shoup's fast modular multiplication, the electronic apparatus 100 may select a prime number less than $2^{\wedge}30$, that is, 30 bits.

3) The electronic apparatus 100 may select grouped prime numbers to be close to each other (i.e., so that the ratio of prime numbers is within a critical range). This is only for user affinity and does not significantly affect precision. The electronic apparatus 100 may track the used scaling factor and adjust the scaling factor in the encryption/decryption step.

Figure 5:
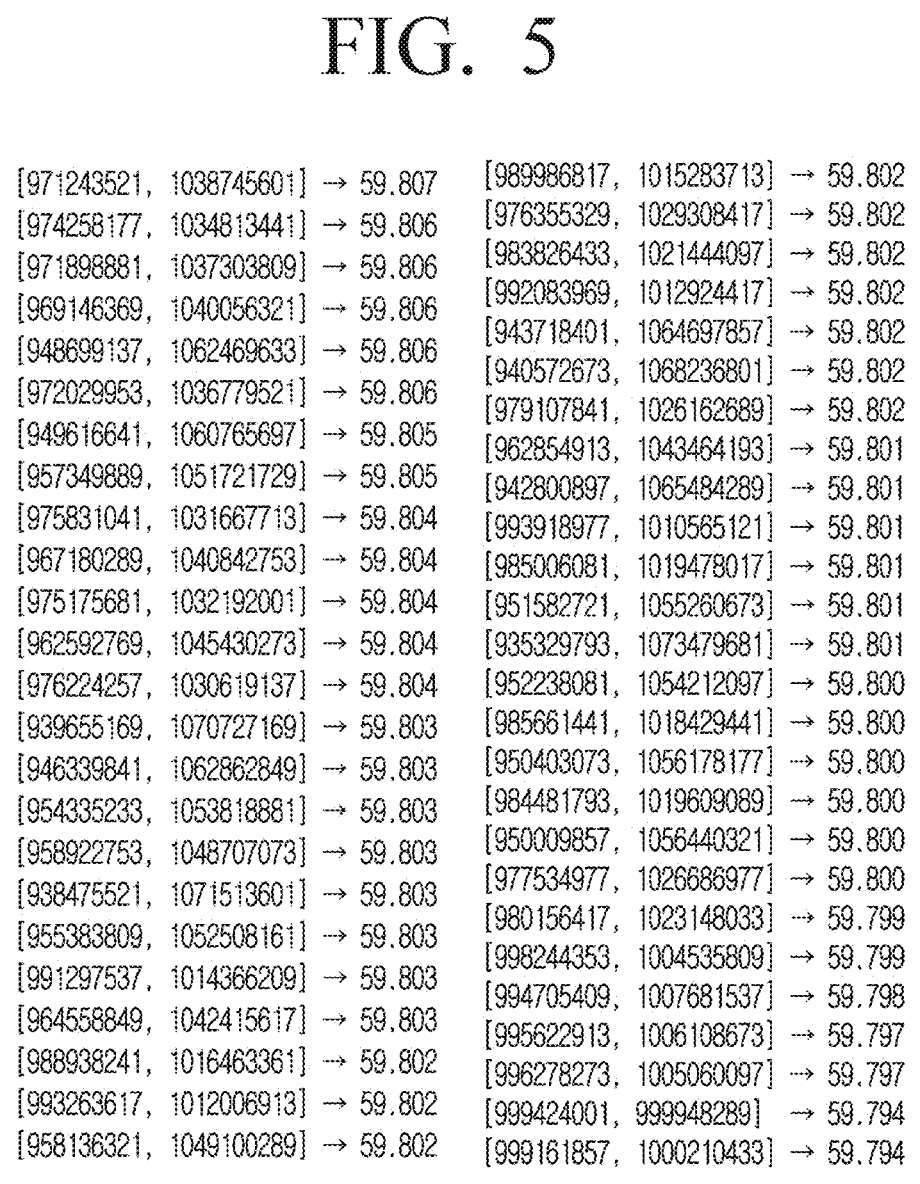
Figure 6:
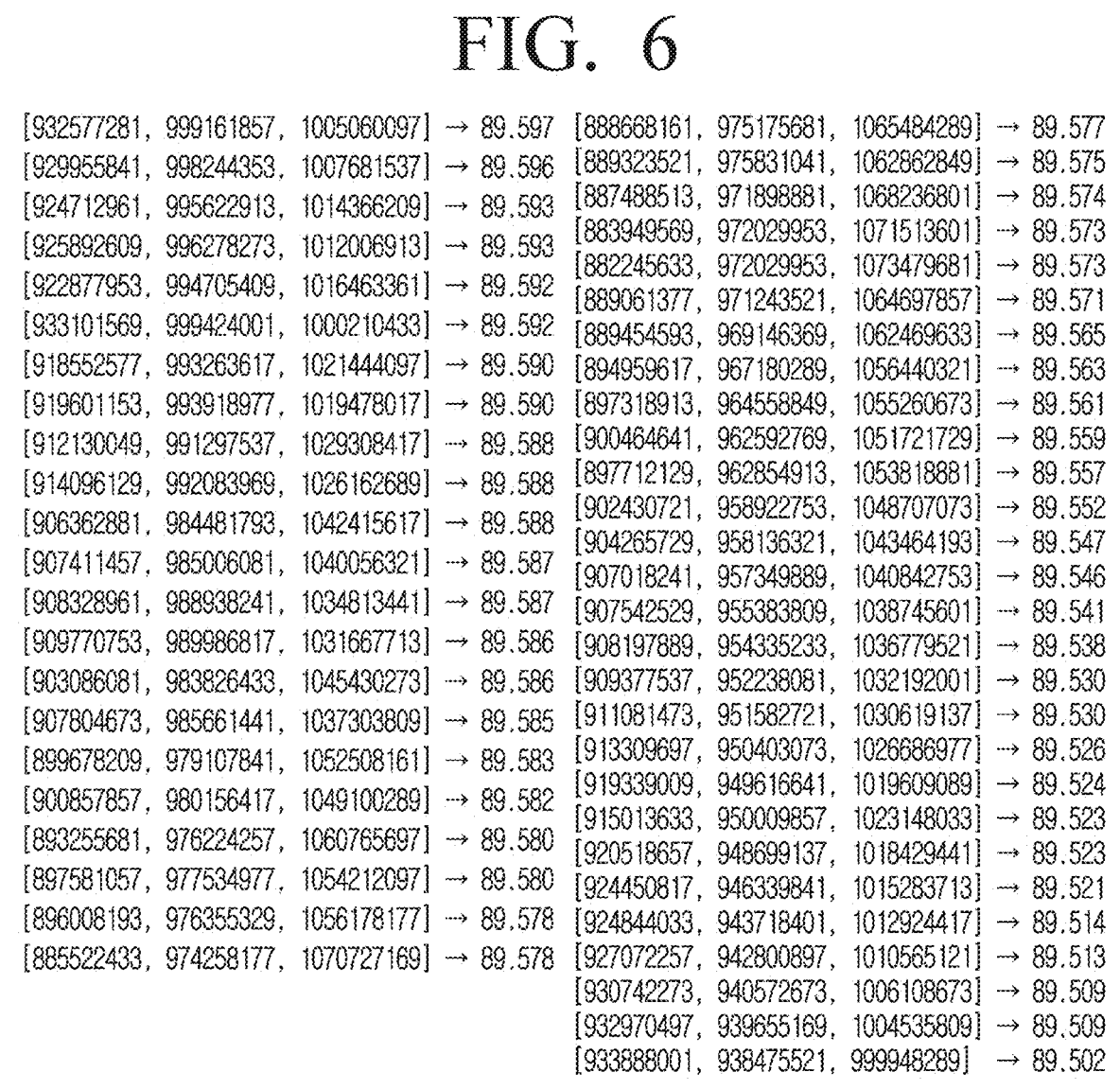
Figure 7:
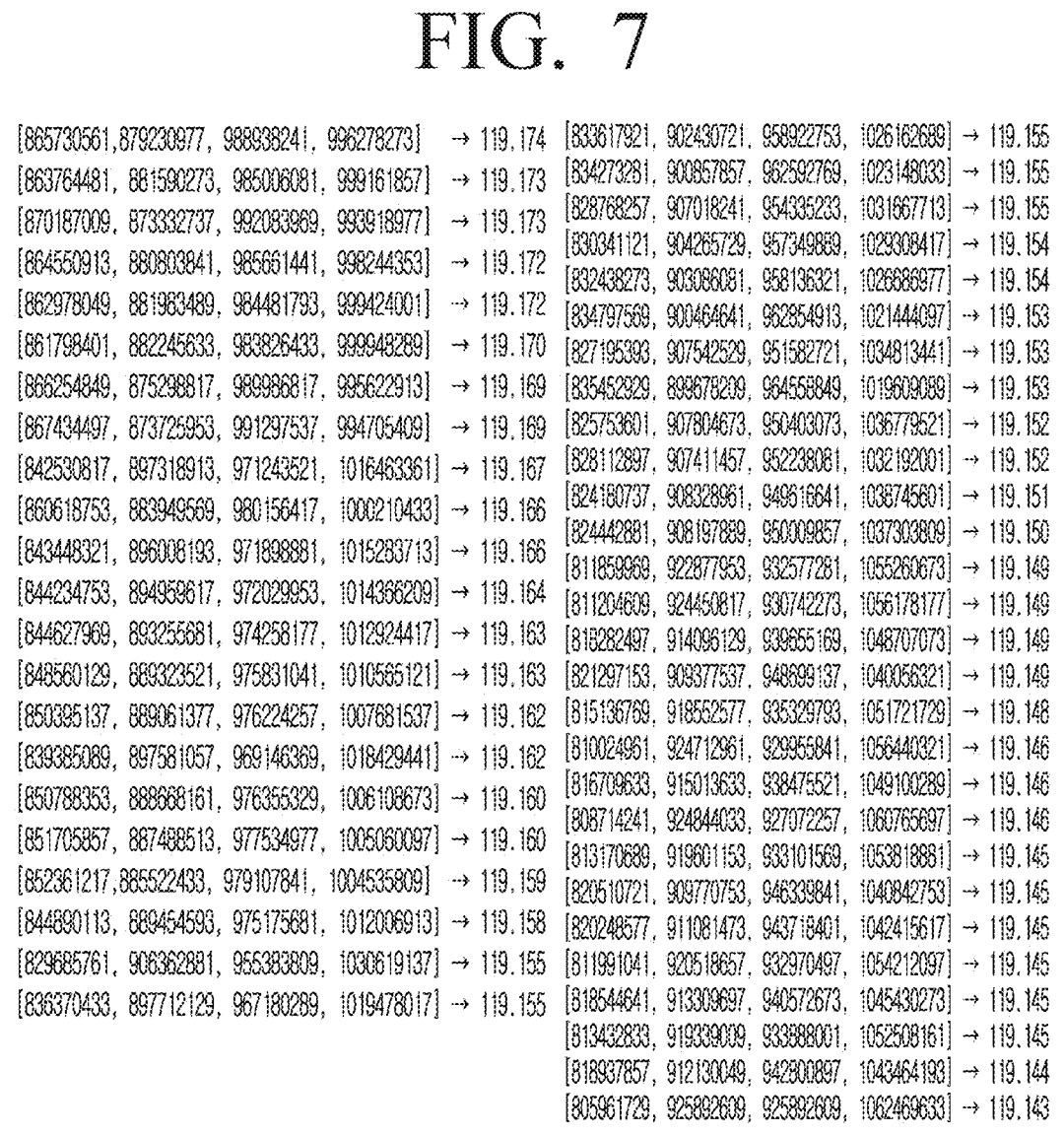

FIGS. 5 to 7 are diagrams for describing a scaling factor composed of a plurality of prime numbers according to an embodiment of the present disclosure.

First, the embodiment of FIGS. 5 to 7 may have a ring dimension of n=216. The electronic apparatus 100 may select a 30-bit prime number so that 1 modulo 2n=217. As illustrated in FIG. 5, the electronic apparatus 100 may select two groups of prime numbers to obtain a 60-bit scaling factor. In addition, as illustrated in FIG. 6, the electronic apparatus 100 may select three groups of prime numbers to obtain a 90-bit scaling factor. In addition, as illustrated in FIG. 7, the electronic apparatus 100 may select four groups of prime numbers to obtain a 120-bit scaling factor.

FIGS. 5 to 7 are diagrams showing 50 samples of the scaling factor to be implemented with a plurality of prime numbers.

As illustrated in FIG. 5, when implementing the 60-bit scaling factor, the largest and smallest scaling factors are 59.807 bits and 59.794 bits, respectively. In this case, the ratio of the two scaling factors may be 1.009.

As illustrated in FIG. 6, when implementing the 90-bit scaling factor, the largest and smallest scaling factors are 89.597 bits and 89.502 bits, respectively. In this case, the ratio of the two scaling factors may be 1.068.

As illustrated in FIG. 7, when implementing the 120-bit scaling factor, the largest and smallest scaling factors are 119.174 bits and 119.143 bits, respectively. In this case, the ratio of the two scaling factors may be 1.021.

Figure 8:
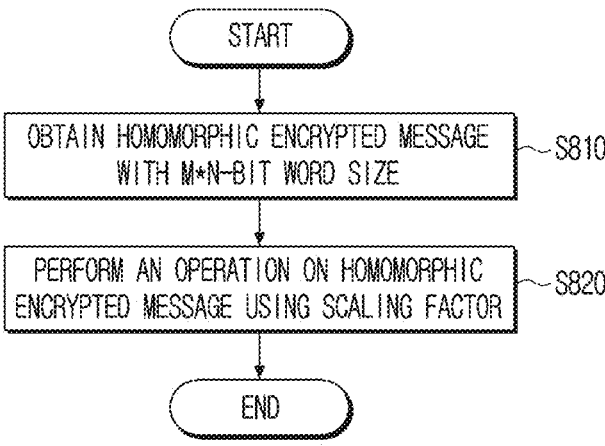
FIG. 8 is a diagram illustrating a control method of an electronic apparatus according to an embodiment of the present disclosure.

FIG. 8 is a diagram illustrating a control method of an electronic apparatus according to an embodiment of the present disclosure. In this case, the electronic apparatus 100 may have the N-bit hardware architecture.

The electronic apparatus 100 may obtain a homomorphic encrypted message with a M*N-bit word size (S810). At this time, M may be an integer of 2 or more.

The electronic apparatus 100 may perform the operation on the homomorphic encrypted message using the scaling factor (S820). In this case, the scaling factor may be composed of M prime numbers and pre-stored in the electronic apparatus 100.

In this case, M prime numbers constituting the scaling factor satisfy 1 modulo 2n, where n may be the ring dimension.

In addition, the M prime numbers constituting the scaling factor may be numbers smaller than $2^K$, and K may be smaller than N by a preset number.

In addition, the scaling factor may be expressed as a product of the M prime numbers, and a ratio of the M prime numbers may be within a preset range.

In this case, the N may be 32, and the M may be 2.

Meanwhile, the methods according to various embodiments of the present disclosure may be included and provided in a computer program product. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smart phones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

The methods according to various embodiments of the present disclosure may be implemented by software including instructions stored in a machine-readable storage medium (for example, a computer-readable storage medium). A machine is an apparatus capable of calling a stored instruction from a storage medium and operating according to the called instruction, and may include the electronic apparatus of the disclosed embodiments.

Meanwhile, the machine-readable storage medium may be provided in a form of a non-transitory storage medium. Here, the "non-transitory storage medium" means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored.

In a case where a command is executed by the processor, the processor may directly perform a function corresponding to the command or other components may perform the function corresponding to the command under a control of the processor. The command may include codes created or executed by a compiler or an interpreter.

Hereinafter, although exemplary embodiments of the present disclosure have been illustrated and described, the present disclosure is not limited to the above-described specific exemplary embodiments, but may be variously modified by those skilled in the art to which the present disclosure pertains without departing from the gist of the present disclosure as disclosed in the accompanying claims. These modifications should also be understood to fall within the scope and spirit of the present disclosure.

| [Description of reference numerals] | |
|---|---|
| 410: Communication device | 420: Memory |
| 430: Display | 440: Manipulation input device |
| 450: Processor | |

The invention claimed is:

1. An electronic apparatus with N-bit hardware architecture, comprising:

a memory configured to store a scaling factor; and a processor configured to obtain a homomorphic encrypted message with an M*N-bit word size, and perform an operation on the homomorphic encrypted message using the scaling factor wherein the operation comprises at least one of a rescaling operation or a relinearize operation, wherein the Mis an integer of 2 or more, and the scaling factor is formed as a product of the M prime numbers, wherein each prime number is limited to number smaller than a hardware architecture bit width, in order to implement a residue number system (RNS) optimized hardware architecture.

2. The electronic apparatus as claimed in claim 1, wherein M prime numbers constituting the scaling factor satisfy 1 modulo 2n, where the n is a ring dimension.

3. The electronic apparatus as claimed in claim 1, wherein the M prime numbers constituting the scaling factor are numbers smaller than $2^K$, and the K is smaller than N by a preset number.

4. The electronic apparatus as claimed in claim 1, wherein the scaling factor is expressed as a product of the M prime numbers, and a ratio between the largest and smallest ones among the M prime numbers is within a preset range.

5. The electronic apparatus as claimed in claim 1, wherein the N is 32, and the M is 2.

6. A control method of an electronic apparatus storing a scaling factor and having N-bit hardware architecture, the control method comprising:

obtaining a homomorphic encrypted message with an M*N-bit word size; and performing an operation on the homomorphic encrypted message using the scaling factor, wherein the operation comprises at least one of a rescaling operation or a relinearize operation, wherein the M is an integer of 2 or more, and the scaling factor is formed by a product of the M prime numbers, wherein each prime number is limited to number smaller than a hardware architecture bit width, in order to implement a residue number system (RNS) optimized hardware architecture.

7. The control method as claimed in claim 6, wherein M prime numbers constituting the scaling factor satisfy 1 modulo 2n, where n is a ring dimension.

8. The control method as claimed in claim 6, wherein the M prime numbers constituting the scaling factor are numbers smaller than $2^K$, and the K is smaller than N by a preset number.

9. The control method as claimed in claim 6, wherein the scaling factor is expressed as a product of the M prime numbers, and a ratio between the largest and smallest ones among the M prime numbers is within a preset range.

10. The control method as claimed in claim 6, wherein the N is 32 and the M is 2.

* * * * *